US008666181B2

(12) United States Patent
Venkatapuram et al.

(10) Patent No.: US 8,666,181 B2
(45) Date of Patent: Mar. 4, 2014

(54) ADAPTIVE MULTIPLE ENGINE IMAGE MOTION DETECTION SYSTEM AND METHOD

(75) Inventors: Prahlad Venkatapuram, San Jose, CA (US); Atul Garg, Sunnyvale, CA (US); Karunakar Rachamreddy, San Jose, CA (US); Visalakshi Vaduganathan, Fremont, CA (US); Manindra Parhy, Fremont, CA (US); Ignatius Tjandrasuwita, Atherton, CA (US)

(73) Assignee: Nvidia Corporation, Santa Clara, CA (US)

( * ) Notice: Subject to any disclaimer, the term of this patent is extended or adjusted under 35 U.S.C. 154(b) by 976 days.

(21) Appl. No.: 12/332,182

(22) Filed: Dec. 10, 2008

(65) Prior Publication Data
US 2010/0142761 A1    Jun. 10, 2010

(51) Int. Cl.
*G06K 9/36* (2006.01)

(52) U.S. Cl.
USPC .................. 382/234; 348/154; 348/407.1

(58) Field of Classification Search
USPC ......... 382/100, 103, 106, 107, 232, 234–239; 348/154, 155, 393.01–410.1
See application file for complete search history.

(56) References Cited

U.S. PATENT DOCUMENTS

| 3,679,821 A | 7/1972 | Schroeder |
| 4,177,514 A | 12/1979 | Rupp |
| 4,583,164 A | 4/1986 | Tolle |
| 4,591,979 A | 5/1986 | Iwashita |
| 4,644,461 A | 2/1987 | Jennings |
| 4,755,810 A | 7/1988 | Knierim |
| 4,814,978 A | 3/1989 | Dennis |
| 4,992,857 A | 2/1991 | Williams |
| 5,045,940 A | 9/1991 | Peters et al. |
| 5,130,797 A | 7/1992 | Murakami et al. |
| 5,146,324 A | 9/1992 | Miller et al. |
| 5,212,742 A | 5/1993 | Normile et al. |
| 5,225,875 A | 7/1993 | Shapiro et al. |
| 5,233,689 A | 8/1993 | Rhoden et al. |
| 5,267,334 A | 11/1993 | Normille et al. |
| 5,369,744 A | 11/1994 | Fukushima et al. |
| 5,371,896 A | 12/1994 | Gove et al. |

(Continued)

FOREIGN PATENT DOCUMENTS

| CN | 1489391 | 4/2004 |
| EP | 1283640 | 2/2003 |

(Continued)

OTHER PUBLICATIONS

Realization of Low-Bit_Ratio Video Encoder Using Mpact Media Processor; Iwasaki, Junichi et al.; 1997.

(Continued)

*Primary Examiner* — Anand Bhatnagar

(57) ABSTRACT

The present invention facilitates efficient and effective detection of pixel alteration. In one embodiment a pixel alteration analysis system includes a difference summing multiple engine component and a control component. The difference summing multiple engine component determines the sum of differences between pixel values in a plurality of pixels. The control component determines an indication of motion based upon said relationship of said pixels in said plurality of pixels. In one exemplary implementation, the difference in values corresponds to a relationship between values of pixels in a block of pixels at different frames. The number and configuration of pixels in a block partition can be flexibly changed.

19 Claims, 15 Drawing Sheets

(56) References Cited

U.S. PATENT DOCUMENTS

| | | |
|---|---|---|
| 5,596,369 A | 1/1997 | Chau |
| 5,598,514 A | 1/1997 | Purcell et al. |
| 5,608,652 A | 3/1997 | Astle |
| 5,613,146 A | 3/1997 | Gove et al. |
| 5,623,311 A | 4/1997 | Phillips et al. |
| 5,630,033 A | 5/1997 | Purcell et al. |
| 5,646,692 A | 7/1997 | Bruls |
| 5,657,465 A | 8/1997 | Davidson et al. |
| 5,768,429 A | 6/1998 | Jabbi et al. |
| 5,790,881 A | 8/1998 | Nguyen |
| 5,809,538 A | 9/1998 | Pollmann et al. |
| 5,821,886 A | 10/1998 | Son |
| 5,845,083 A | 12/1998 | Hamadani et al. |
| 5,870,310 A | 2/1999 | Malladi |
| 5,883,823 A | 3/1999 | Ding |
| 5,889,949 A | 3/1999 | Charles |
| 5,898,881 A | 4/1999 | Miura et al. |
| 5,909,224 A | 6/1999 | Fung |
| 5,923,375 A | 7/1999 | Pau |
| 5,954,786 A | 9/1999 | Volkonsky |
| 5,969,728 A | 10/1999 | Dye et al. |
| 5,999,220 A | 12/1999 | Washino |
| 6,035,349 A | 3/2000 | Ha et al. |
| 6,073,185 A | 6/2000 | Meeker |
| 6,088,355 A | 7/2000 | Mills et al. |
| 6,098,174 A | 8/2000 | Baron et al. |
| 6,104,470 A | 8/2000 | Streefkerk et al. |
| 6,144,362 A | 11/2000 | Kawai |
| 6,148,109 A | 11/2000 | Boon et al. |
| 6,157,751 A | 12/2000 | Olson et al. |
| 6,175,594 B1 | 1/2001 | Strasser et al. |
| 6,188,799 B1 | 2/2001 | Tan et al. |
| 6,195,389 B1 | 2/2001 | Rodriguez et al. |
| 6,222,883 B1 | 4/2001 | Murdock et al. |
| 6,269,174 B1 | 7/2001 | Koba et al. |
| 6,272,281 B1 | 8/2001 | De Vos et al. |
| 6,305,021 B1 | 10/2001 | Kim |
| 6,311,204 B1 | 10/2001 | Mills |
| 6,317,124 B2 | 11/2001 | Reynolds |
| 6,356,945 B1 | 3/2002 | Shaw et al. |
| 6,360,234 B2 | 3/2002 | Jain et al. |
| 6,418,166 B1 | 7/2002 | Wu et al. |
| 6,459,738 B1 | 10/2002 | Wu et al. |
| 6,539,060 B1 | 3/2003 | Lee et al. |
| 6,539,120 B1 | 3/2003 | Sita et al. |
| 6,560,629 B1 | 5/2003 | Harris |
| 6,647,062 B2* | 11/2003 | Mackinnon ............... 375/240.16 |
| 6,665,346 B1 | 12/2003 | Lee et al. |
| 6,687,788 B2 | 2/2004 | Vorbach et al. |
| 6,690,835 B1* | 2/2004 | Brockmeyer et al. ......... 382/236 |
| 6,690,836 B2 | 2/2004 | Natarajan et al. |
| 6,721,830 B2 | 4/2004 | Vorbach et al. |
| 6,751,721 B1 | 6/2004 | Webb, Jr. et al. |
| 6,760,478 B1 | 7/2004 | Adiletta et al. |
| 6,782,052 B2 | 8/2004 | Sun et al. |
| 6,799,192 B1 | 9/2004 | Handley |
| 6,807,317 B2 | 10/2004 | Mathew et al. |
| 6,823,443 B2 | 11/2004 | Horiyama et al. |
| 6,950,473 B2 | 9/2005 | Kim et al. |
| 6,996,645 B1 | 2/2006 | Wiedenman et al. |
| 7,038,687 B2 | 5/2006 | Booth, Jr. et al. |
| 7,173,631 B2 | 2/2007 | Anderson |
| 7,260,148 B2 | 8/2007 | Sohm |
| 7,277,101 B2 | 10/2007 | Zeng |
| 7,289,672 B2 | 10/2007 | Sun et al. |
| 7,379,501 B2 | 5/2008 | Lainema |
| 7,403,564 B2 | 7/2008 | Laksono |
| 7,450,640 B2 | 11/2008 | Kim et al. |
| 7,499,491 B2 | 3/2009 | Lee et al. |
| 7,548,586 B1 | 6/2009 | Mimar |
| 7,548,596 B2 | 6/2009 | Yen et al. |
| 7,551,671 B2 | 6/2009 | Tyldesley et al. |
| 7,565,077 B2 | 7/2009 | Rai et al. |
| 7,581,182 B1 | 8/2009 | Herz |
| 7,630,097 B2 | 12/2009 | Kodama et al. |
| 7,689,000 B2* | 3/2010 | Kazama ...................... 382/103 |
| 7,693,219 B2 | 4/2010 | Yan |
| 7,720,311 B1 | 5/2010 | Sriram |
| 7,721,069 B2 | 5/2010 | Ramchandran et al. |
| 7,924,923 B2* | 4/2011 | Lee et al. ................. 375/240.16 |
| 8,009,923 B2 | 8/2011 | Li et al. |
| 8,369,402 B2 | 2/2013 | Kobayashi et al. |
| 2001/0020941 A1 | 9/2001 | Reynolds |
| 2001/0024448 A1 | 9/2001 | Takase et al. |
| 2001/0028353 A1 | 10/2001 | Cheng |
| 2001/0028354 A1 | 10/2001 | Cheng et al. |
| 2002/0015445 A1 | 2/2002 | Hashimoto |
| 2002/0015513 A1 | 2/2002 | Ando et al. |
| 2002/0025001 A1 | 2/2002 | Ismaeil et al. |
| 2002/0041626 A1 | 4/2002 | Yoshioka et al. |
| 2002/0109790 A1* | 8/2002 | Mackinnon .................. 348/699 |
| 2002/0114394 A1 | 8/2002 | Ma |
| 2002/0118743 A1 | 8/2002 | Jiang |
| 2003/0020835 A1 | 1/2003 | Petrescu |
| 2003/0048361 A1 | 3/2003 | Safai |
| 2003/0078952 A1 | 4/2003 | Kim et al. |
| 2003/0141434 A1 | 7/2003 | Ishikawa et al. |
| 2003/0161400 A1 | 8/2003 | Dinerstein et al. |
| 2004/0057523 A1 | 3/2004 | Koto et al. |
| 2004/0095998 A1 | 5/2004 | Luo et al. |
| 2004/0100466 A1 | 5/2004 | Deering |
| 2004/0150841 A1 | 8/2004 | Lieberman et al. |
| 2004/0156435 A1 | 8/2004 | Itoh et al. |
| 2004/0174998 A1 | 9/2004 | Youatt et al. |
| 2004/0181564 A1 | 9/2004 | MacInnis et al. |
| 2004/0181800 A1 | 9/2004 | Rakib et al. |
| 2004/0190613 A1 | 9/2004 | Zhu et al. |
| 2004/0190617 A1 | 9/2004 | Shen et al. |
| 2004/0202245 A1* | 10/2004 | Murakami et al. ............ 375/240 |
| 2004/0213348 A1 | 10/2004 | Kim et al. |
| 2004/0218626 A1 | 11/2004 | Tyldesley et al. |
| 2004/0218675 A1* | 11/2004 | Kim et al. ................. 375/240.16 |
| 2004/0228415 A1 | 11/2004 | Wang |
| 2004/0257434 A1 | 12/2004 | Davis et al. |
| 2005/0008254 A1 | 1/2005 | Ouchi et al. |
| 2005/0033788 A1 | 2/2005 | Handley |
| 2005/0047502 A1 | 3/2005 | McGowan |
| 2005/0066205 A1 | 3/2005 | Holmer |
| 2005/0079914 A1 | 4/2005 | Kaido et al. |
| 2005/0105618 A1 | 5/2005 | Booth et al. |
| 2005/0123040 A1 | 6/2005 | Bjontegard |
| 2005/0190976 A1* | 9/2005 | Todoroki et al. .............. 382/236 |
| 2005/0238102 A1* | 10/2005 | Lee et al. ................. 375/240.16 |
| 2005/0238103 A1 | 10/2005 | Subramaniyan et al. |
| 2005/0265447 A1 | 12/2005 | Park |
| 2005/0265454 A1 | 12/2005 | Muthukrishnan et al. |
| 2005/0276493 A1 | 12/2005 | Xin et al. |
| 2005/0281337 A1 | 12/2005 | Kobayashi et al. |
| 2005/0286630 A1 | 12/2005 | Tong et al. |
| 2006/0002466 A1 | 1/2006 | Park |
| 2006/0017802 A1 | 1/2006 | Yoo et al. |
| 2006/0056513 A1 | 3/2006 | Shen et al. |
| 2006/0056708 A1 | 3/2006 | Shen et al. |
| 2006/0109910 A1 | 5/2006 | Nagarajan |
| 2006/0115001 A1 | 6/2006 | Wang et al. |
| 2006/0133501 A1* | 6/2006 | Lee et al. ................. 375/240.16 |
| 2006/0133506 A1 | 6/2006 | Dang |
| 2006/0176299 A1 | 8/2006 | Subbalakshmi et al. |
| 2006/0176962 A1 | 8/2006 | Arimura et al. |
| 2006/0203916 A1 | 9/2006 | Chandramouly et al. |
| 2007/0002945 A1 | 1/2007 | Kim |
| 2007/0002950 A1 | 1/2007 | Yang |
| 2007/0036215 A1 | 2/2007 | Pan et al. |
| 2007/0070080 A1 | 3/2007 | Graham et al. |
| 2007/0133689 A1* | 6/2007 | Park et al. ................ 375/240.21 |
| 2007/0171981 A1 | 7/2007 | Qi |
| 2007/0217506 A1 | 9/2007 | Yang et al. |
| 2007/0230564 A1 | 10/2007 | Chen et al. |
| 2007/0274389 A1 | 11/2007 | Kim et al. |
| 2007/0286284 A1 | 12/2007 | Ito et al. |
| 2007/0286508 A1 | 12/2007 | Le Leannec et al. |
| 2008/0069203 A1 | 3/2008 | Karczewicz et al. |
| 2008/0117214 A1 | 5/2008 | Perani et al. |
| 2008/0137726 A1 | 6/2008 | Chatterjee et al. |

(56) References Cited

U.S. PATENT DOCUMENTS

| | | |
|---|---|---|
| 2008/0151997 A1 | 6/2008 | Oguz |
| 2008/0285444 A1 | 11/2008 | Diab et al. |
| 2009/0060277 A1* | 3/2009 | Zhang et al. .................. 382/103 |
| 2009/0086827 A1 | 4/2009 | Wu et al. |
| 2009/0116549 A1 | 5/2009 | Shen et al. |
| 2009/0122864 A1 | 5/2009 | Palfner et al. |
| 2009/0161763 A1* | 6/2009 | Rossignol et al. ....... 375/240.16 |
| 2009/0196350 A1 | 8/2009 | Xiong |
| 2009/0268974 A1 | 10/2009 | Takagi |
| 2010/0034268 A1 | 2/2010 | Kusakabe et al. |

FOREIGN PATENT DOCUMENTS

| | | |
|---|---|---|
| GB | 2348559 | 3/1999 |
| JP | 04162893 | 6/1992 |
| JP | 11096138 | 4/1999 |
| JP | 2001184323 | 7/2001 |
| JP | 2005354686 | 12/2005 |
| JP | 2006287315 | 10/2006 |
| WO | 9827742 | 6/1998 |
| WO | 0233650 | 4/2002 |
| WO | 2005001625 | 1/2005 |
| WO | 2005096168 | 10/2005 |
| WO | 2006085137 | 8/2006 |

OTHER PUBLICATIONS

Rohini Krishnan, et al., "Design of a 2D DCT/IDCT Application Specific VLIW Processor Supporting Scaled and Sub-sampled Blocks," 16th International Conference on VLSI Design, 2003, six pages.

Shih-Hao Wang et al.; "A platform-based MPEG-4 advanced video coding (AVC) decoder with block level pipelining," Information, Communications and Signal Processing, 2003 and the Fourth Pacific Rim Conference on Multimedia Proceedings of the 2003 Joint Conference of the Fourth International Conference on, vol. 1, No., p. 51-55 vol. 1, Dec. 2003.

Tourapis et al., Proc. Of SPIE Conf. Vis. Comm. And Img. Processing, vol. 3, pp. 1365-1373, Jun. 2000.

Tu, C., Liang, J., and Tran, T. "Adaptive Runlength Coding", in_IEEE Signal Processing Letters_vol. 10, No. 3, pp. 61-66. Mar. 2003.

Tung-Chien Chen; Yu-Wen Huang; Liang-Gee Chen, "Analysis and design of macroblock pipelining for H.264/AVC VLSI architecture," Circuits and Systems, 2004. ISCAS '04. Proceedings of the 2004 International Symposium on, vol. 2, No., pp. 11-273-6 vol. 2, May 23-26, 2004.

Zheng, et al., Inter. Conf. Info. Systems, Analysis and Synthesis, SCI 2001-ISAS 2001, vol. 13, 2001.

"Ralf Schafer et al.,", "H.264/AVC", Dated: Jan. 2003, pp. 1-12.

A Single-Chip Video/Audio Codec for Low Bit Rate Application Seongmo Park, Seongmin Kim, Igkyun Kim, Kyungjin Byun, Jin Jong Cha, and Hanjin Cho, ETRI Journal, vol. 22, No. 1, Mar. 2000, pp. 20-29.

The Merriam-Webster Dictionary_. 2005 ed. Springfield, MA: Merriam-Webster Inc., 2005.

Advanced Video Coding for generic audiovisual services, Telecommunication Standardization Sector of ITU, Dated Mar. 2005, pp. 1-343.

Andrew Gibson, "H.264 Video Encoding Standard", year Aug. 2002, pp. 1-98, Queens University Kingston Ontario Canada.

Chen, Hao et al., "Adaptive FMO Selection Strategy for Error Resilient H.264 Coding" International Conference on Audio, Language and Image Processing, 2008. ICALIP 2008, Jul. 7-9, 2008, pp. 868-872.

Hannuksela, Miska et al., "Random Access Using Isolated Regions", IEEE 2003, pp. III-841 to III to 844.

Iwasaki, I.; Naganuma, J.; Nitta, K.; Yoshitome, T.; Ogura, M.; Nakajima, Y.; Tashiro, Y.; Onishi, T.; Ikeda, M.; Endo, M., "Single-chip MPEG-2 422P@HL CODEC LSI with multi-chip configuration for large scale processing beyond HDTV level," Design, Automation and Test in Europe Conference and Exhibition, Mar. 2003.

Jamil-Ur-Rehman and Dr. Zhang Ye, "Efficient Techniques for Signaling Intra Prediction modes of H.264/Mpeg-4 Part 10", Proceedings of the First International Conference on Innovative Computing, Information and Control, ICICIC, Year 2006, pp. 1-4.

Jong, et al., "Accuracy Improvement and Cost Reduction of 3-Step Search Block Matching Algorithm for Video Coding", Feb. 1, 1994, IEEE Transaction on Circuits and Systems for Video Technology, vol. 4 No. 1, pp. 88-90, XP000439487.

Mizuno, M. et al.; "A 1.5-W single-chip MPEG-2 MP@ML video encoder with low power motion estimation and clocking," Solid-State Circuits, IEEE Journal of, vol. 32, No. 11, pp. 18-7-1816, Nov. 1997.

Kadono Shinya, et. Al. Revised edition H. 264/AVC Textbook, Impress R&D, Jan. 1, 2006, pp. 131-133.

\* cited by examiner

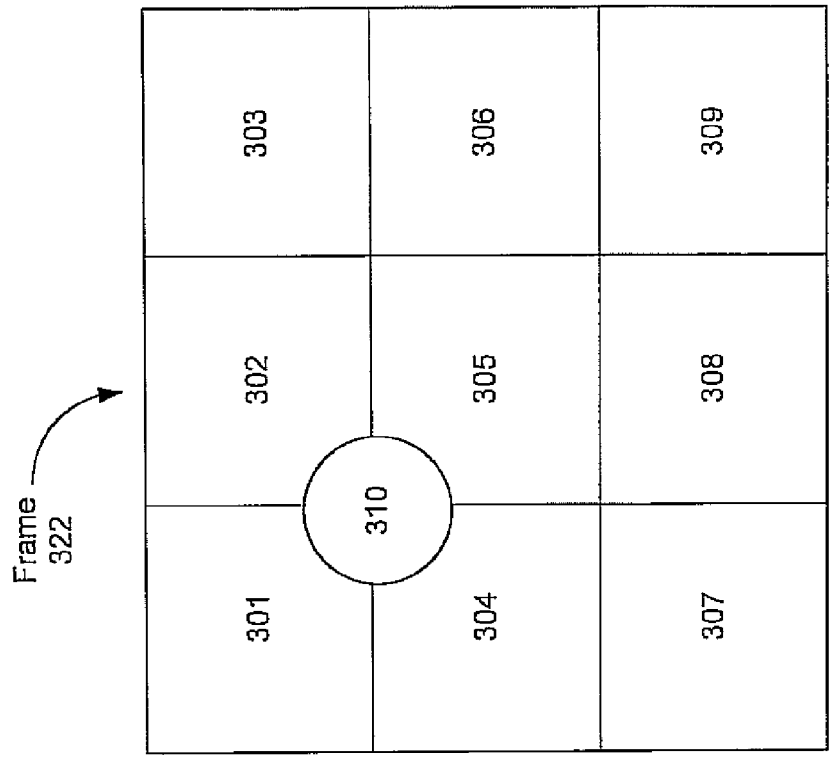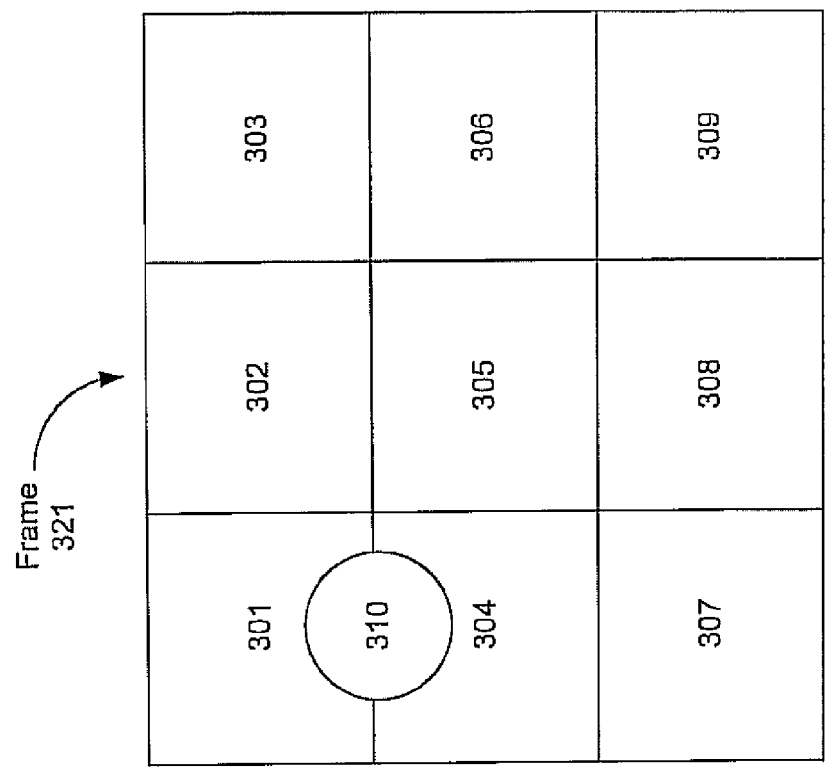
FIG 3A

| Configuration | Number of Possible Partitions | Partition Names |
|---|---|---|
| 4X4 | 16 | 4X4_0, 4X4_1, 4X4_2, ... 4X4_14, 4X4_15 |
| 4X8 | 8 | 4X8_0, 4X8_1, 4X8_2, ... 4X8_7, 4X8_7 |
| 8X4 | 8 | 8X4_0, 8X4_1, 8X4_2, ... 8X4_6, 8X4_7 |
| 8X8 | 4 | 8X8_0, 8X8_1, 8X8_2, 8X8_3 |
| 8X16 | 2 | 16X8_0 and 16X8_1 |
| 16X8 | 2 | 8X16_0 and 8X16_1 |
| 16X16 | 1 | 16X16 |

FIG 4A

16X8 Mode

| 16X8_0 |
|---|
| 16X8_1 |

8X16 Mode

| 8X16_0 | 8X16_1 |
|---|---|

8X8 Mode

| 8X8_0 | 8X8_1 |
|---|---|
| 8X8_2 | 8X8_3 |

Possible 8X4 Submode

| 8X4_0 | 8X4_2 |
|---|---|
| 8X4_1 | 8X4_3 |
| 8X4_4 | 8X4_6 |
| 8X4_5 | 8X4_7 |

Possible 4X8 Submode

| 4X8_0 | 4X8_1 | 4X8_2 | 4X8_3 |
|---|---|---|---|
| 4X8_4 | 4X8_5 | 4X8_6 | 4X8_7 |

Possible 4X4 Submode

| 4X4_0 | 4X4_1 | 4X4_4 | 4X4_5 |
|---|---|---|---|
| 4X4_2 | 4X4_3 | 4X4_6 | 4X4_7 |
| 4X4_8 | 4X4_9 | 4X4_12 | 4X4_13 |
| 4X4_10 | 4X4_11 | 4X4-14 | 4X4_15 |

16X16 Submode

| 16X16 |
|---|

FIG4B

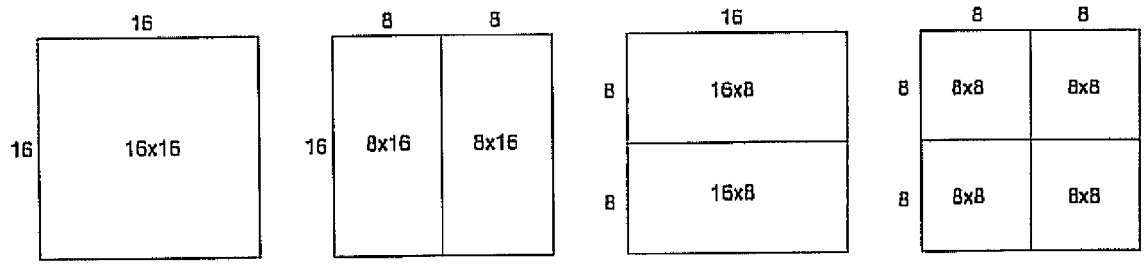
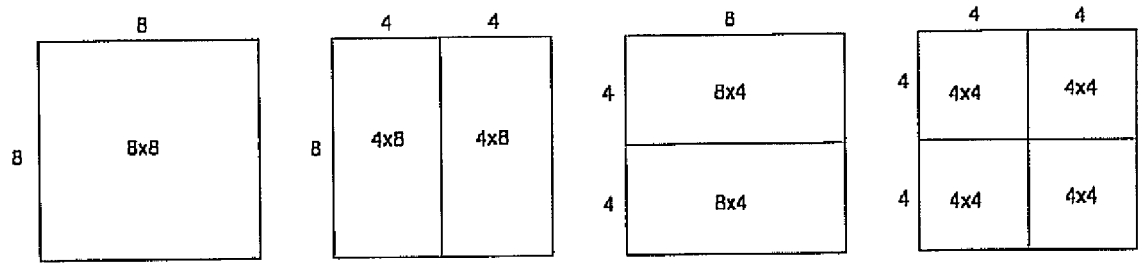
Fig 4C $$[Sm] \qquad [Dx] \qquad [Sm]^T$$

$$\begin{vmatrix} 1 & 1 & 1 & 1 \\ 1 & 1 & -1 & -1 \\ 1 & -1 & -1 & 1 \\ 1 & -1 & 1 & -1 \end{vmatrix} \quad \begin{vmatrix} d0 & d1 & d2 & d3 \\ d4 & d5 & d6 & d7 \\ d8 & d9 & d10 & d11 \\ d12 & d13 & d14 & d15 \end{vmatrix} \quad \begin{vmatrix} 1 & 1 & 1 & 1 \\ 1 & 1 & -1 & -1 \\ 1 & -1 & -1 & 1 \\ 1 & -1 & 1 & -1 \end{vmatrix}$$

ADAPTIVE MULTIPLE ENGINE IMAGE MOTION DETECTION SYSTEM AND METHOD

FIELD OF THE INVENTION

The present invention relates to the field of video encoding.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Frequently, these activities involve video encoding and decoding. However, encoding and decoding can involve complicated processing that occupies valuable resources and consumes time.

SUMMARY

The present invention facilitates efficient and effective detection of pixel alteration. In one embodiment a pixel alteration analysis system includes a difference summing multiple engine component and a control component. The difference summing multiple engine component determines the sum of differences between pixel values in a plurality of pixels. The control component determines an indication of motion based upon said relationship of said pixels in said plurality of pixels. In one exemplary implementation, the difference in values corresponds to a relationship between values of pixels in a block of pixels at different frames. The number and configuration of pixels in a block partition can be flexibly changed.

DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

FIG. 3A is a block diagram of one exemplary depiction of image movement in accordance with one embodiment of the present invention.

FIG. 4A shows an exemplary partition mapping table in accordance with one embodiment of the present invention.

FIG. 4B is a graphical representation of exemplary different partition modes in accordance with one embodiment of the present invention.

FIG. 4C is an block diagram of possible mixed modes in accordance with one embodiment.

FIG. 4D is a block diagram of exemplary matrixes in accordance with one embodiment of the present invention

DETAILED DESCRIPTION

Figure 1:
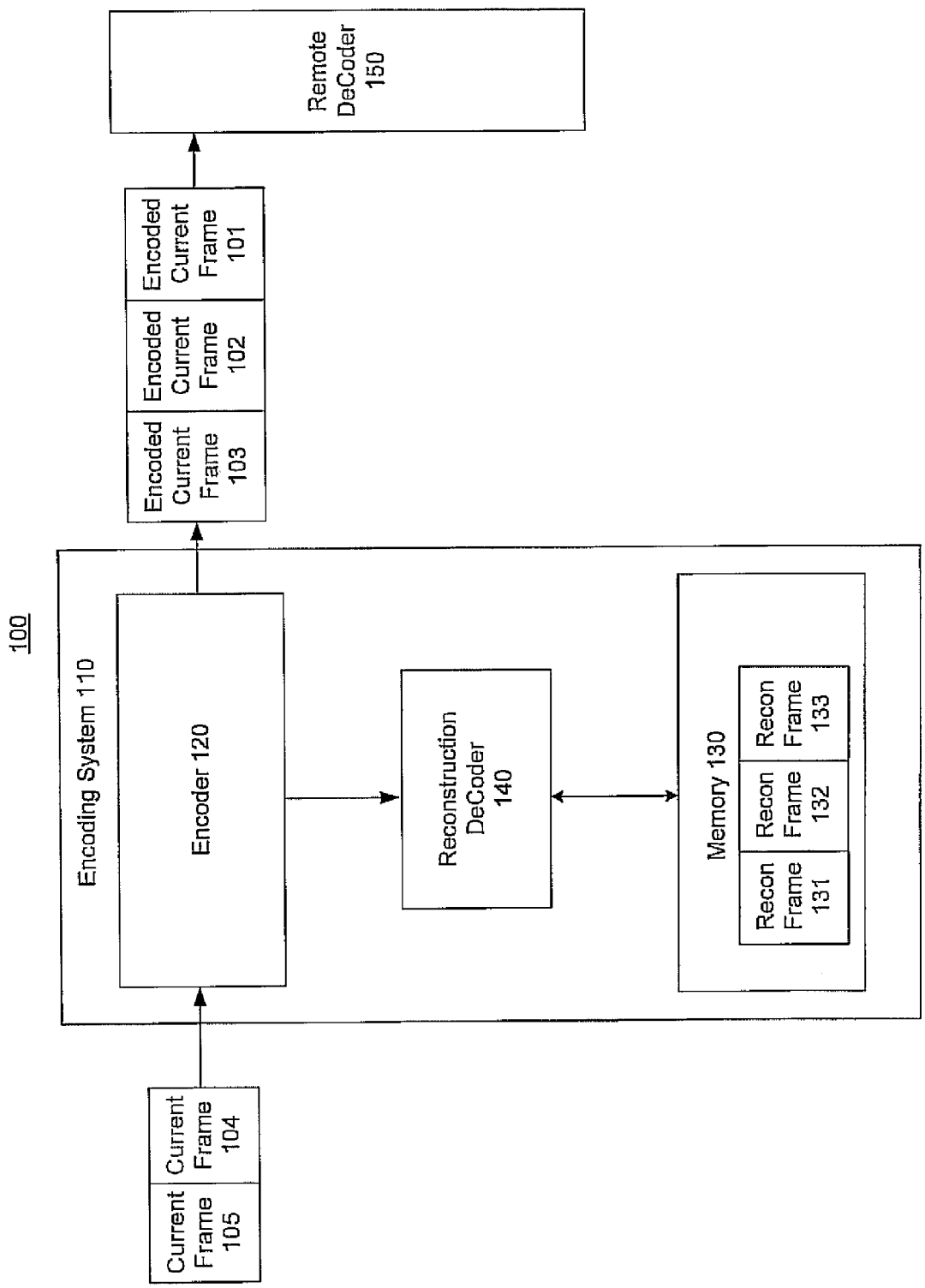
FIG. 1 is a block diagram of an exemplary encoding architecture in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The present invention facilitates effective and efficient determination of changes in pixel values. In one embodiment, the present invention directs multiple instantiations of units capable of determining characteristics associated with changes in pixel values in parallel. The changes in pixel values can occur over time, between frames, etc. It is appreciated the present invention can be utilized to analyze pixel changes associated with a variety of configurations (e.g., video frames, streaming content frames, etc.) and formats (e.g., HDTV, H264, MPEG2, MPEG4, etc.). It is also appreciated that the present invention can be implemented to perform various analyses of pixel value changes. For example, the analysis can include Sum of the Absolute Transform Difference (SATD), Sum of Absolute Difference (SAD), Mean Absolute Deviation (MAD), sum of the squares, difference median, average between values, etc. The analysis can be further extended to indicate a minimum SATD, minimum SAD, maximum SATD, maximum SAD, average SATD, average SAD, etc. The results of the analysis can be forwarded for utilization in a variety of operations. For example, the results of the analysis can be utilized as a cost function in determining a motion vector during a motion search process related to a video encoder.

The present invention is also readily implemented to analyze changes in a group and sub-group of pixels of various sizes and configurations. For example, each basic unit or sub-unit engine can be configured to analyze a group of pixels (e.g., 4×4 or 4 columns by 4 rows of data, etc.) and the results can be accumulated to provide analysis of different pixel group size and configuration (e.g., a 16×16 macro group of pixels, 16 columns×4 rows of pixels, etc.) In one exemplary implementation, optimal computation of the values is performed by pipelining and processing one row of pixels at a time.

While it is appreciated the present invention is very flexible and readily adaptable to a variety of configurations and formats, the following description is presented primarily with regards to an implementation in which a minimum SATD and SAD is utilized as cost functions in determining a motion vector during a motion search process related to a video encoder. Other embodiments, implementations, configurations, formats, instances, methods, procedures, components, and circuits have not been described in detail as not to unnecessarily obscure aspects of the current invention.

FIG. 1 is a block diagram of an exemplary encoding architecture 100 in accordance with one embodiment of the present invention. Encoding architecture 100 includes encoding system 110 and remote decoder 150. Encoding system 110 receives current frames (e.g., current frames 104 and 105) encodes the current frames, and then forwards the encoded current frames (e.g., encoded current frames 101, 102 and 103 to remote decoder 150. Encoding system 100 includes encoder 120, reconstruction decoder 140 and memory 130. The encoder 120 encodes the frames and forwards them to remote decoder 150 and reconstruction decoder 140. Reconstruction decoder 140 decodes the frames and forwards them to memory 130 for storage as reconstructed frames 131, 132 and 133. In one exemplary implementation, the reconstructed frames 131, 132 and 133 correspond to encoded current frames 101, 102 and 103. The frames include either encoded, reconstructed or raw pixel values corresponding to image presentation.

FIG. 3A is a block diagram of one exemplary depiction of image movement. The pixels 301 through 309 are some pixels associated with frames 321 and 322. In one exemplary implementation, frames 321 and 322 are similar to current frames 102 and 103 respectively. The other pixels associated with frames 321 through 322 are not shown so as not to unnecessarily obfuscate the invention. It is appreciated that the frames 321 through 322 can include a number of different pixel configurations and can be configured to be compatible with a variety of video frame formats (e.g., HDTV, MPEG, etc.). In frame 321 the ball image 310 is partially depicted by pixels 301 and 304. In frame 322 the ball image "moves" to be partially depicted by pixels 301, 302, 304 and 305. A variety of values associated with the pixels change as the ball image movement is depicted by the pixels. For example, if pixels 301, 302, 304 and 305 depicted an image of grass in frame 321, the color value associated with the pixels would be the color of grass (e.g., green, etc.) with corresponding luminance and chrominance values. For example, the luminance value 910 for pixel 301, luminance value 920 for pixel 302, luminance value 915 for pixel 304 and luminance value 930 for pixel 305. The color values associated with the pixels 301, 302, 304 and 305 in frame 322 would include the color of a ball (e.g., white, brown, etc.) with corresponding luminance and chrominance values when the ball image moved to be depicted by the pixels. For example, the luminance value 910 for pixel 301 changes to 935, luminance value 920 for pixel 302 changes to 955, luminance value 915 for pixel 304 changes to 985 and luminance value 930 for pixel 305 changes to 995.

Figure 3B:
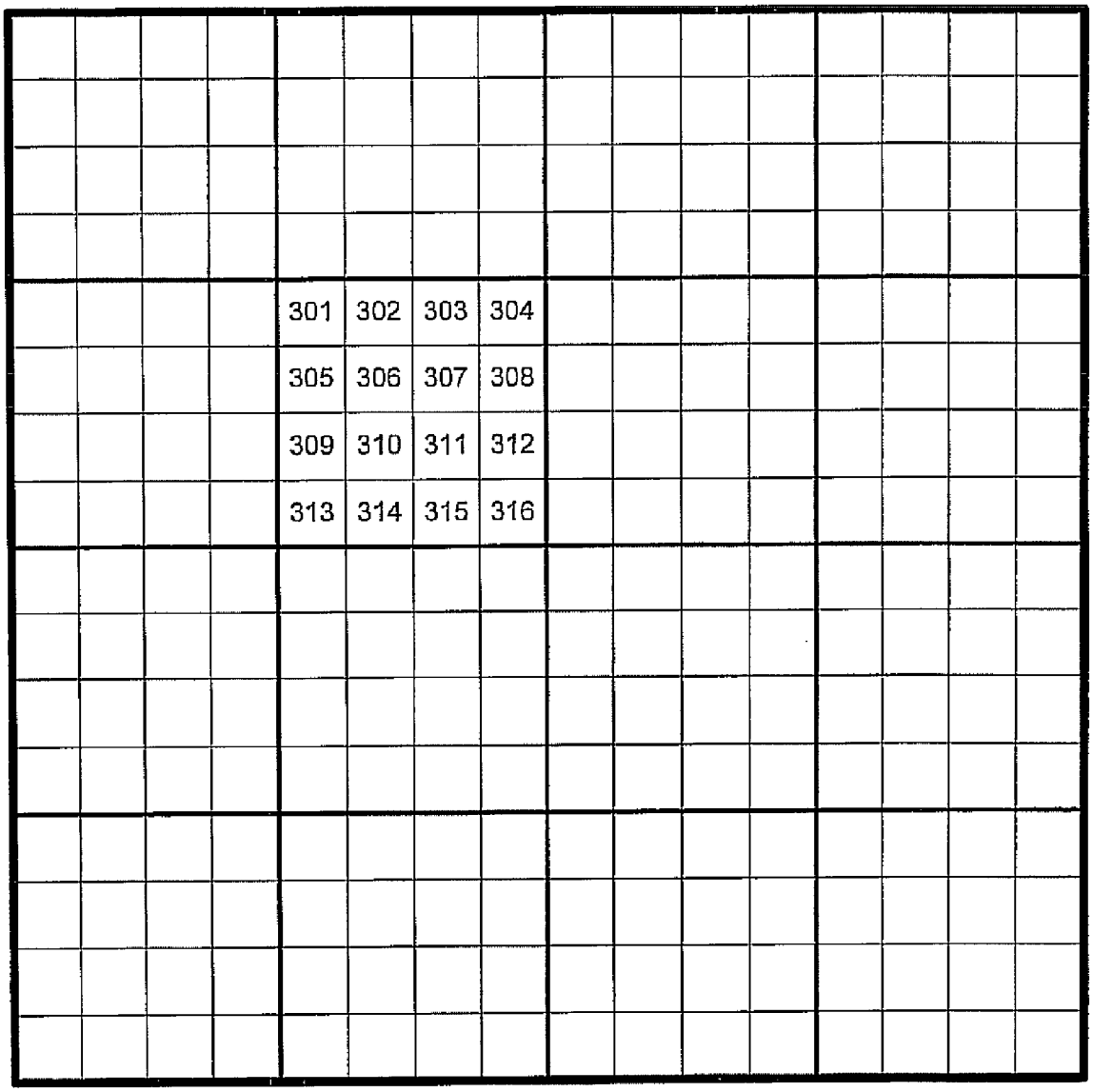
FIG. 3B is a block diagram of an exemplary 16 pixel by 16 pixel frame macro in accordance with one embodiment of the present invention.

It is appreciated the pixels can be configured or arranged in a variety pixel group or sub-group associations. FIG. 3B is a block diagram of exemplary 16 pixel by 16 pixel macroblock 320. In one exemplary implementation, the 16 pixel by 16 pixel frame macroblock 320 includes sixteen 4 pixel by 4 pixel blocks, a 4 pixel by 4 pixel block comprising pixels 301 through 316. The present invention can be utilized to analyze the group or sub-groups of pixel association. Additional explanation of exemplary group and sub-group pixel value alteration analysis is set forth below.

Figure 2:
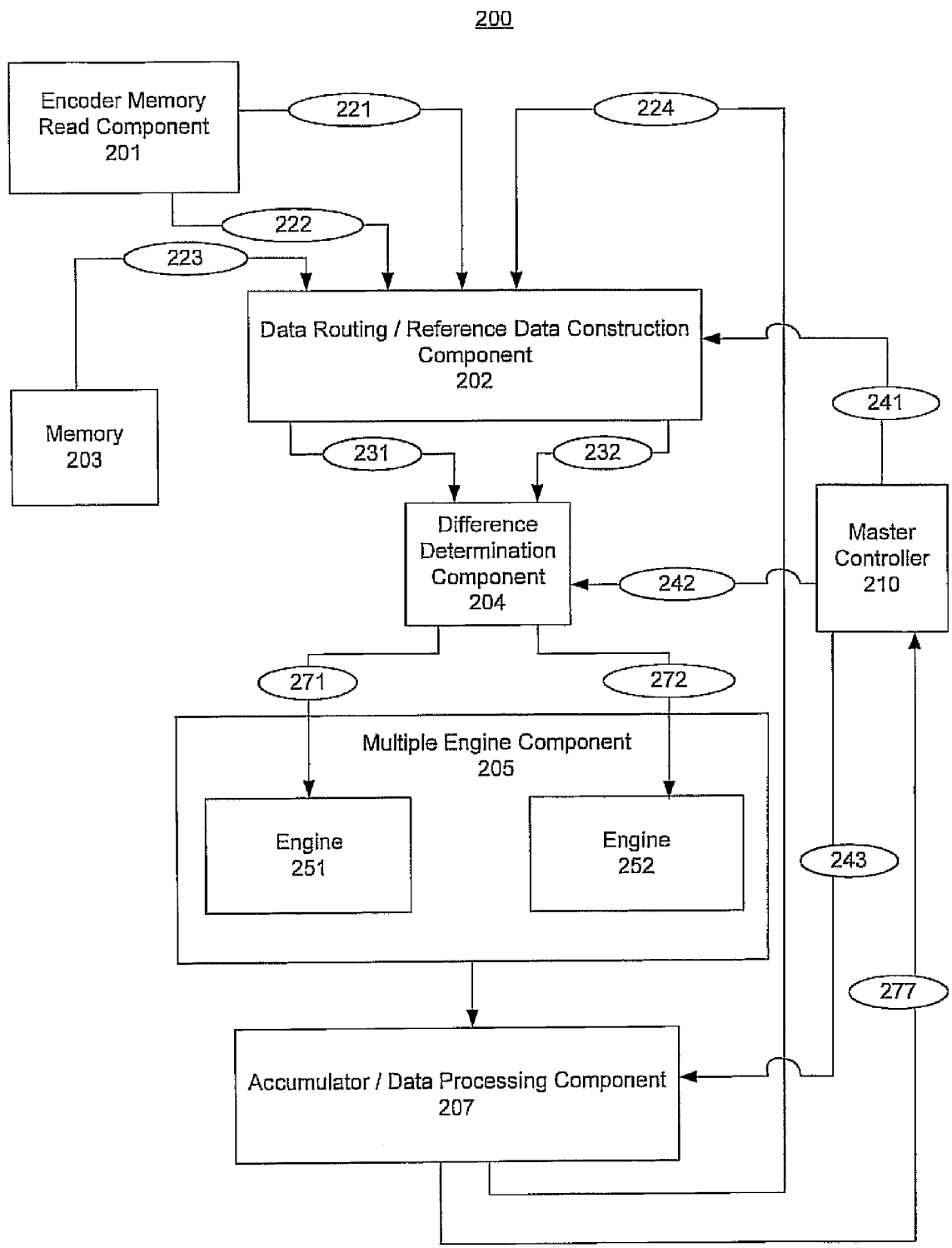
FIG. 2 is a block diagram of an exemplary pixel alteration analysis system in accordance with one embodiment of the present invention.

FIG. 2 is a block diagram of exemplary pixel alteration analysis system 200 in accordance with one embodiment of the present invention. Pixel alteration analysis system 200 includes an encoder memory read component 201, memory 203, data routing/reference data construction component 202, difference determination component 204, difference summing multiple engine component 205, a master controller 210 and accumulator data processing component 207. The multiple relationship determination engine component 205 includes difference summing engines 251 and 252. For example, the values of frames 321 and 322 are fed into a pixel alteration analysis system (e.g., pixel alteration analysis system 200) for processing. For example, the luminance value 910 of pixel 301 in frame 321 and the luminance value of 935 of pixel 301 in frame 322 are feed into pixel alteration analysis system.

The components of pixel alteration analysis system 200 cooperatively operate to provide an indication of the lowest sum of the differences in pixel values (e.g., between frames). Encoder memory read component 201 retrieves information from an encoding system (e.g., encoding system 110). Memory 203 stores additional pixel information. In one exemplary implementation, memory 203 stores super sampled predicted data (e.g., pixel fragments, etc.). Data routing/reference data construction component 202 routes various pixel data to difference determination component 204. Difference determination component 204 determines a difference in values for the pixels in a block at different frames based upon the information forwarded from the data routing/reference data construction component 202. Difference summing multiple engine component 205 determines the sum of difference between pixel values in a plurality of pixels. Accumulator data processing component 207 accumulates the data in a variety of partition sizes. The controller 210 directs operations of the components of pixel alteration analysis system 200 and determines results forwarded to other components.

It is appreciated the data routing/reference data construction component 202 can select from a variety of signals to route to the difference determination component 204 as inputs. In one exemplary implementation, the difference determination component 204 has two inputs classified as current data (e.g., raw pixels, etc.) and reference data (e.g., predicted pixels, etc.). The source of the current data and reference data that is routed to the difference determination component 204 can change based upon the mode of operation. In one embodiment, the data routing/reference data construction component 202 selects between super-sampled predicted data 223, current pixel data 222, predicted full pixel data 221, and internally computed predicted data 224 from a previous pass. The current data can be provided by a memory controller and the reference data can include:

a) predicted full pixel data provided by an encoder memory read client during a process of motion search;

b) internally computed predicted data provided by other processing units including the accumulator/data processing logic during the process of motion search; and c) super-sampled predicted data provided by the internal RAM (local storage) which is part of an encoder sub-system during search optimization process.

It is appreciated that the controller 210 can facilitate a variety of control implementations. Controller 210 can issue a mode control to the multiple relationship determination engine component 205. For example, the mode control can include Sum of the Absolute Transform Difference (SATD) mode or Sum of the Absolute Difference (SAD) mode. The controller 210 can also indicate or direct the data router/reference data construction component 202 which of the inputs to forward to the difference determination component 204. The controller 210 can also indicate or direct accumulator data processing component 207 on the size of an accumulation partition. The control component determines an indication of motion based upon said relationship of said pixels in said plurality of pixels. For example, the control component can indicate a minimum of summation of the differences.

In one embodiment, analysis is accumulated in accordance with a partition map. FIG. 4A shows an exemplary partition mapping table 410 in accordance with one embodiment of the present invention. Partition mapping table 410 corresponds to a 16×16 macro block. In one exemplary implementation, the various costs being accumulated or derived out of a 4 by 4 (4×4) pixel block are 4×4, 4×8, 8×4, 8×8, 16×8, 8×16 and 16×16. It is appreciated that partition mapping can also include mixed modes. For example, in a mixed mode of a 16×16 macro block, the 8×8_0 partition can be split into two 4×8's, the 8×8_1 partition could remain the same, the 8×8_2 partition can be split into four 4×4 sub blocks, and so on in a variety of different combinations. FIG. 4C is an block diagram of possible mixed modes in accordance with one embodiment.

In addition to providing the SATD values associated with the configurations or partitions to the motion search control engine simultaneously, cost values can also be provided. The cost values can be provided at different durations. For example, the cost values related to the 4×4 and 8×4 configurations or partitions after 5 clock cycles, 4×8, 8×8, 16×8 configurations after 9 clock cycles and the 8×16 and 16×16 configurations after 18 clock cycles. FIG. 4B is a graphical representation of exemplary different partition modes in accordance with one embodiment of the present invention. Exemplary modes are also shown in FIG. 4C.

In one embodiment, difference summing engines 251 and 252 perform matrix multiplication operations to determine the SATD or SAD. FIG. 4D is a block diagram of exemplary matrices in accordance with one embodiment of the present invention. The [Sm]T and [Sm] matrix are the SATD transform matrix. The Dx matrix is the difference matrix and includes differences d0 through d15. In one embodiment, the difference matrix includes the differences between the corresponding values routed to the difference determination component 204. In one exemplary implementation, the difference determination component 204 determines the difference between the current data and the reference data. In one exemplary implementation, the differences, d0 through d15 correspond to differences between the values of pixel 301 through 316 of frames 321 and 322. For example, the difference d7 corresponds to the difference in luminance value 920 of pixel 308 in frame 321 and the luminance value of 955 of pixel 308 in frame 322. It is appreciated the values associated with the pixels can correspond to a variety of pixel characteristics. For example, the values can correspond to luminance, chrominance, color, etc. In one embodiment, the matrix processing also includes a Hadamard matrix [Sm].

In one exemplary implementation, in order to facilitate row wise processing, the right matrix multiplication is performed first and the values are stored in the 16 registers and followed by the result matrix multiplied with the left Hadamard matrix [SM]. In the case of SAD operation, Sum of Absolute difference is computed for the differential data fed to the engine specified above as Dx. The SATD matrix multiplication operation is bypassed in this mode. In video encoding scenarios, several engines are utilized to speed up the encoding process. In one embodiment, 4 macro engines (e.g., engines 530 through 533 in FIG. 5, etc.) are instantiated to operate in parallel to realize a 16 column by 4 row SATD engine.

It is appreciated the difference summing engines can be implemented in a variety of configurations. For example, each of the dual difference summing engines 251 and 252 can have 4 parallel instances of a 4×4 macro engine. The sum of the difference analysis (e.g., SAD, SATD, etc.), minimum determination and cost can be accumulated and refreshed at every 4×4 block boundary. This facilitates great flexibility in computing various costs on the fly.

Figure 5:
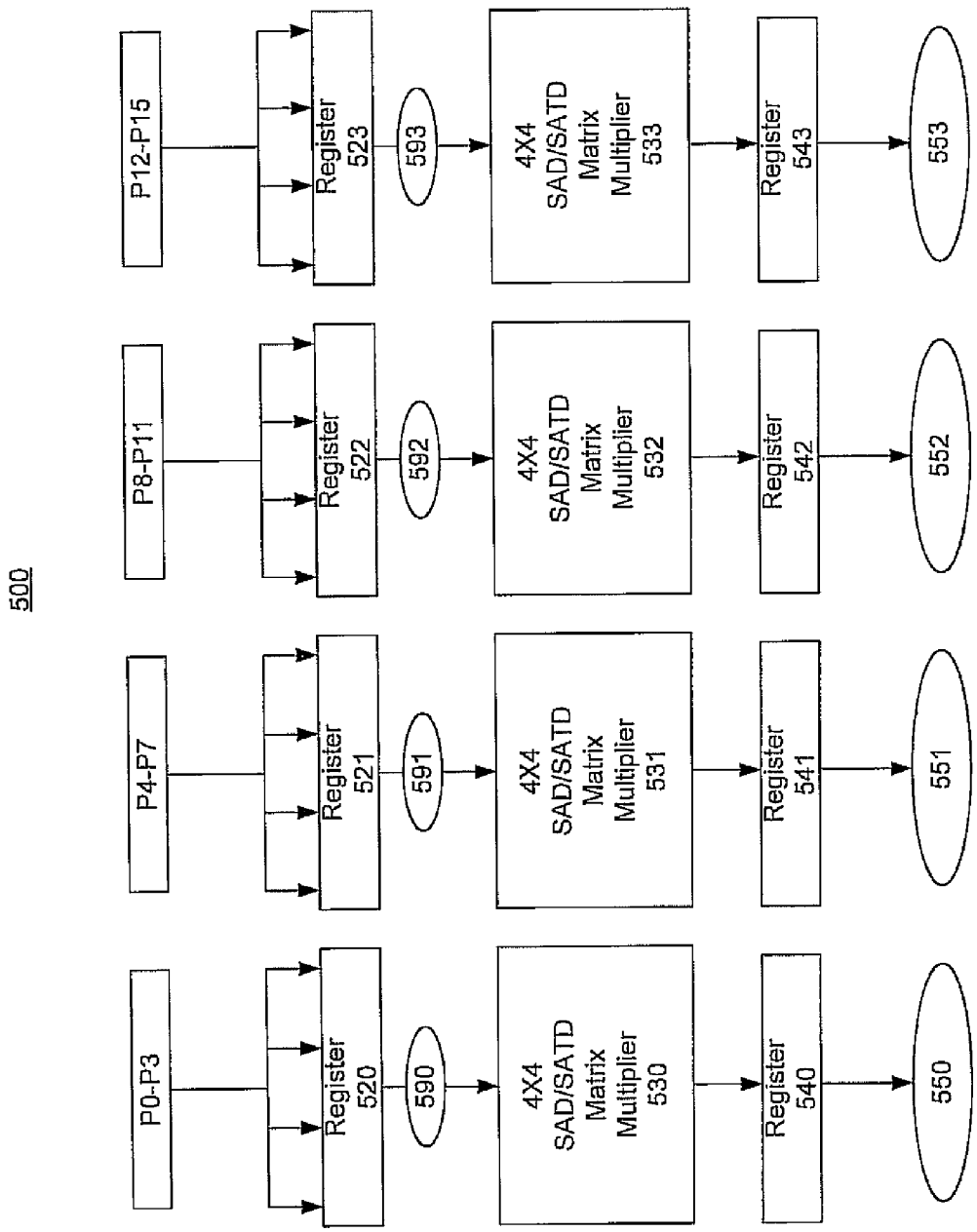
FIG. 5 is a block diagram of an exemplary engine in accordance with one embodiment of the present invention.

FIG. 5 is a block diagram of exemplary macro engine 500 in accordance with one embodiment of the present invention. In one embodiment, engine 500 corresponds to difference summing engine 251. While the present description is with respect to engine 500, additional components similar to engine 500 can be provided for difference summing engine 252 (e.g., two implementations of engine 500, one implementation of engine 500 corresponding to difference summing engine 251 and another implementation of engine 500 corresponding to difference summing engine 252). Engine 500 includes pixel difference input registers 520 through 523, 4×4 matrix multipliers 530 through 533, and intermediate sum of the difference output registers 540 through 543.

The components of engine 500 cooperatively operate to perform sum of the difference functions. Registers 540 through 543 output signals 550 through 553. Pixel difference input registers 520 through 523 receives difference of pixel values associated with 4 pixels. In one embodiment, the inputs are the difference between the current data and the reference data that is also computed as part of the complete engine and is the input data specific to one basic engine (e.g., a basic 4×4 SATD engine, etc.). For example, pixel difference input register 520 receives pixels P0 through P3 (e.g., pixels A-D, etc.). Pixel difference input registers 521 receives difference of pixel values associated with pixels P4 through P7 (e.g., pixels E-H, etc.). Pixel difference input registers 522 receives difference of pixel values associated with pixels P8 through P11 (e.g., pixels I-L, etc.). Pixel difference input registers 523 receives difference of pixel values associated with pixels P12 through P15 (e.g., pixels M-P, etc.).

Figure 6:
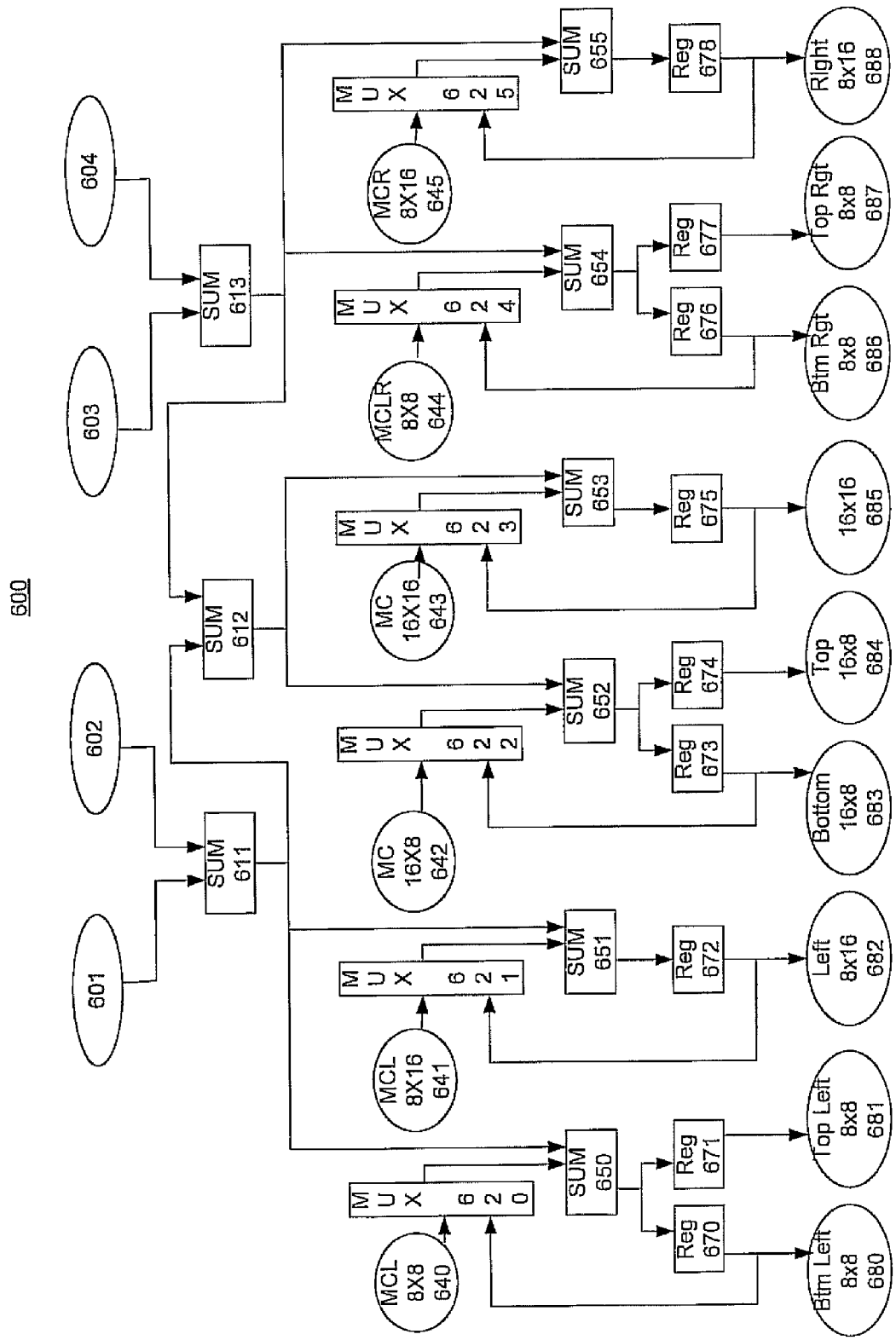
FIG. 6 is a block diagram of an exemplary accumulator in accordance with one embodiment of the present invention.

FIG. 6 is a block diagram of exemplary accumulator 600 in accordance with one embodiment of the present invention. In one embodiment, accumulator 600 corresponds to an accumulator in a 16×4 configuration. Accumulator 600 includes summation components 611 through 613, multiplexers 620 through 625, summation components 650 through 655 and registers 670 through 678. The summation components receive inputs 601 through 604. In one embodiment, the inputs 601 through 604 correspond to output signals 550 through 553. Multiplexers forward return summation information to summation components 650 through 655 in accordance with multiplex control logic signals 640 through 645. Summation components 650 through 655 sum the information from mutliplexers 620 through 625 with information from summation component 611 through 613 and output corresponding signals 680 through 688. The outputs specified in FIG. 6 can be extended to other partitions within a 16×16 macro block (e.g., partitions shown in FIGS. 4A and 4B, etc.). In one embodiment, control signals are utilized to facilitate power conservation. In one embodiment control signals (e.g., from an external agent, a motion search control logic, etc.) turn on accumulators that provide the cost values specified based on software programming of video modes/sub-mode search types.

Since SATD engine cost computation can be controlled by an external engine, the clock scheme for the engine can also be controlled very finely thus achieving flexibility with respect to clock gating the irrelevant logic based on the mode of operations. This facilitates further power reduction and utilization in low power designs. In one exemplary implementation it takes 18 cycles to compute 16×16 costs. In the $19^{th}$ clock cycle, the motion search control logic can look at the two costs coming form the two engines and stores the best value. This increases the bandwidth of the motion search engine.

It is appreciated the results from the pixel alteration analysis system 200 can be utilized for a variety of functions. For example, an output of the minimum SATD or SAD can be utilized in determining a motion vector for image movement in a video presentation. The minimum SATD or SAD can also be utilized as a cost function in encoding/decoding pixel information.

Figure 9:
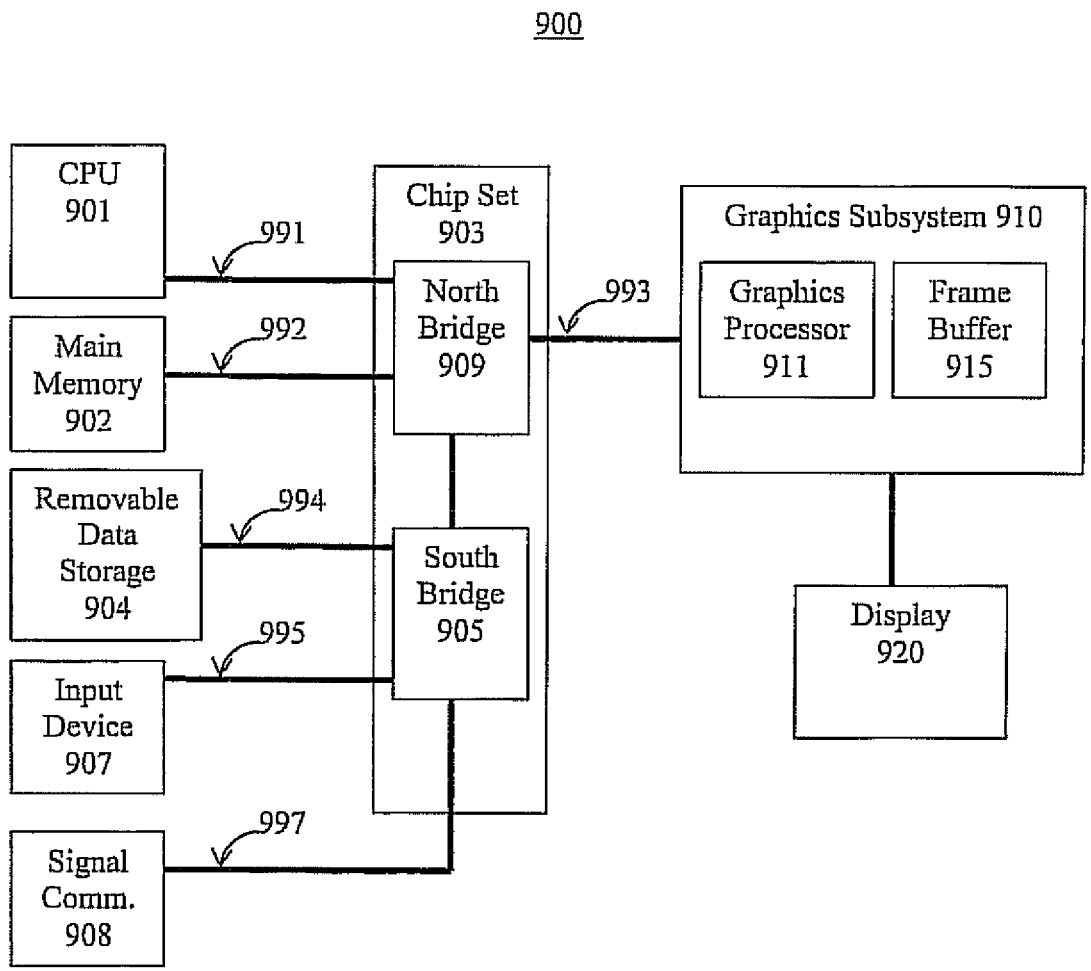
FIG. 9 is a block diagram of an exemplary computer system upon which embodiments of the present invention can be implemented.

With reference to FIG. 9, a block diagram of an exemplary computer system 900 is shown, one embodiment of a computer system upon which embodiments of the present invention can be implemented. Computer system 900 includes central processor unit 901, main memory 902 (e.g., random access memory), chip set 903 with north bridge 909 and south bridge 905, removable data storage device 904, input device 907, signal communications port 908, and graphics subsystem 910 which is coupled to display 920. Computer system 900 includes several busses for communicatively coupling the components of computer system 900. Communication bus 991 (e.g., a front side bus) couples north bridge 909 of chipset 903 to central processor unit 901. Communication bus 992 (e.g., a main memory bus) couples north bridge 909 of chipset 903 to main memory 902. Communication bus 993 (e.g., the Advanced Graphics Port interface) couples north bridge of chipset 903 to graphic subsystem 910. Communication buses 994, 995 and 997 (e.g., a PCI bus) couple south bridge 905 of chip set 903 to removable data storage device 904, input device 907, signal communications port 908 respectively. Graphics subsystem 910 includes graphics processor 911 and frame buffer 915.

The components of computer system 900 cooperatively operate to provide versatile functionality and performance. In one exemplary implementation, the components of computer system 900 cooperatively operate to provide predetermined types of functionality, even though some of the functional components included in computer system 900 may be defective. Communications bus 991, 992, 993, 994, 995 and 997 communicate information. Central processor 901 processes information. Main memory 902 stores information and instructions for the central processor 901. Removable data storage device 904 also stores information and instructions (e.g., functioning as a large information reservoir). Input device 907 provides a mechanism for inputting information and/or for pointing to or highlighting information on display 920. Signal communication port 908 provides a communication interface to exterior devices (e.g., an interface with a network). Display device 920 displays information in accordance with data stored in frame buffer 915. Graphics processor 911 processes graphics commands from central processor 901 and provides the resulting data to video buffers 915 for storage and retrieval by display monitor 920.

Figure 7:
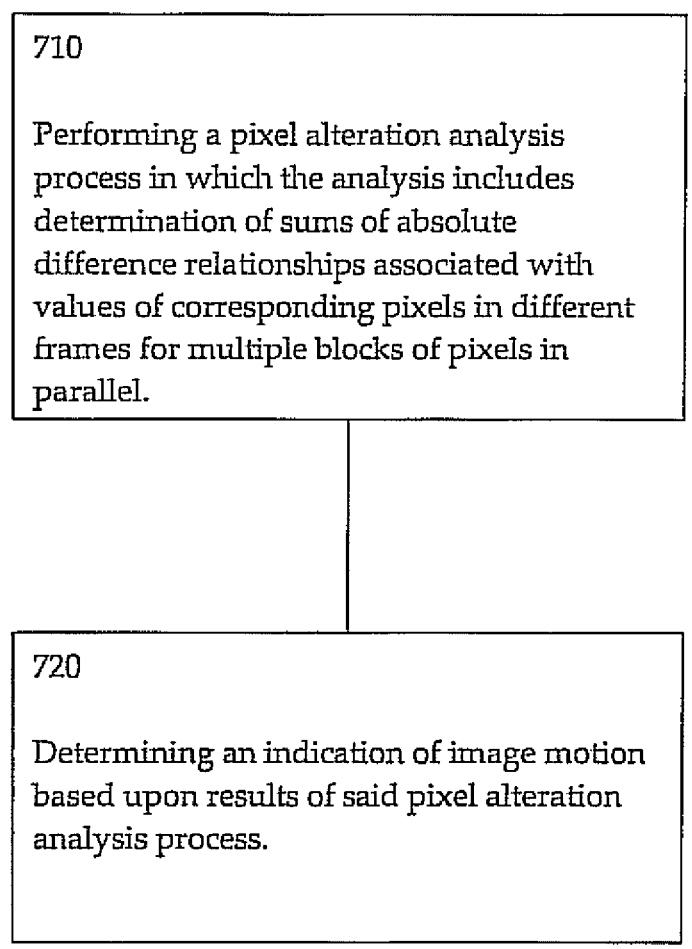
FIG. 7 is a flow chart of an exemplary image motion detection method in accordance with one embodiment of the present invention.

FIG. 7 is a flow chart of an image motion detection method 700 in accordance with one embodiment of the present invention.

At 710, a pixel alteration analysis process is performed in which the analysis includes determination of sums of absolute difference relationships associated with values of corresponding pixels in different frames for multiple blocks of pixels in parallel. In one embodiment, the alteration analysis process includes accumulating results in different levels of granularity.

At 720, an indication of image motion is determined based upon results of the pixel alteration analysis process. In one embodiment, the results of the pixel alteration analysis process are also utilized as a cost function for determining a motion vector for an image.

Figure 8:
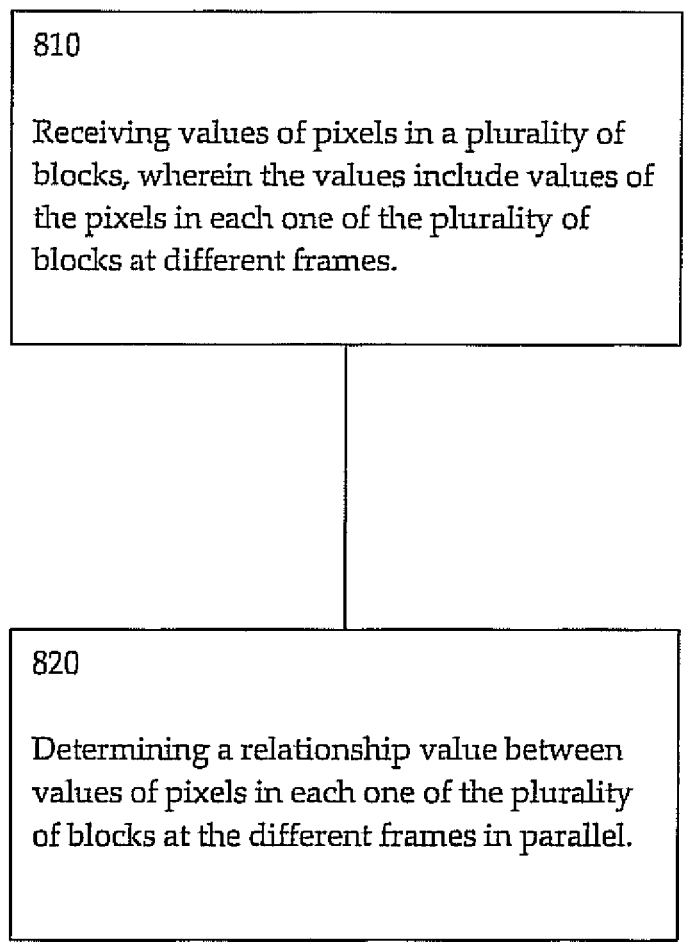
FIG. 8 is a flow chart of an exemplary pixel alteration analysis method in accordance with one embodiment of the present invention.

FIG. 8 is a flow chart of exemplary pixel alteration analysis method 800 in accordance with one embodiment of the present invention.

At 810, values of pixels in a plurality of blocks are received, wherein the values include values of the pixels in each one of the plurality of blocks at different frames. In one embodiment, a row of the values of pixels in the blocks is processed at a time. In one embodiment, the receiving includes selecting between among current pixel data, stored predicted pixel data, super sampled predicted data and internally computed predicted data based upon the mode determination.

At 820, a relationship value between values of pixels in each one of the plurality of blocks at different frames are determined in parallel. In one embodiment, a difference in the values of each one of the pixels in each one of the plurality of blocks at different frames is determined. The determination can include analysis of a relationship value including a SATD value, SAD value, etc. In one exemplary implementation, mode determination is made. In one embodiment, an image motion indication is detected based upon the relationship value.

Figure 10:
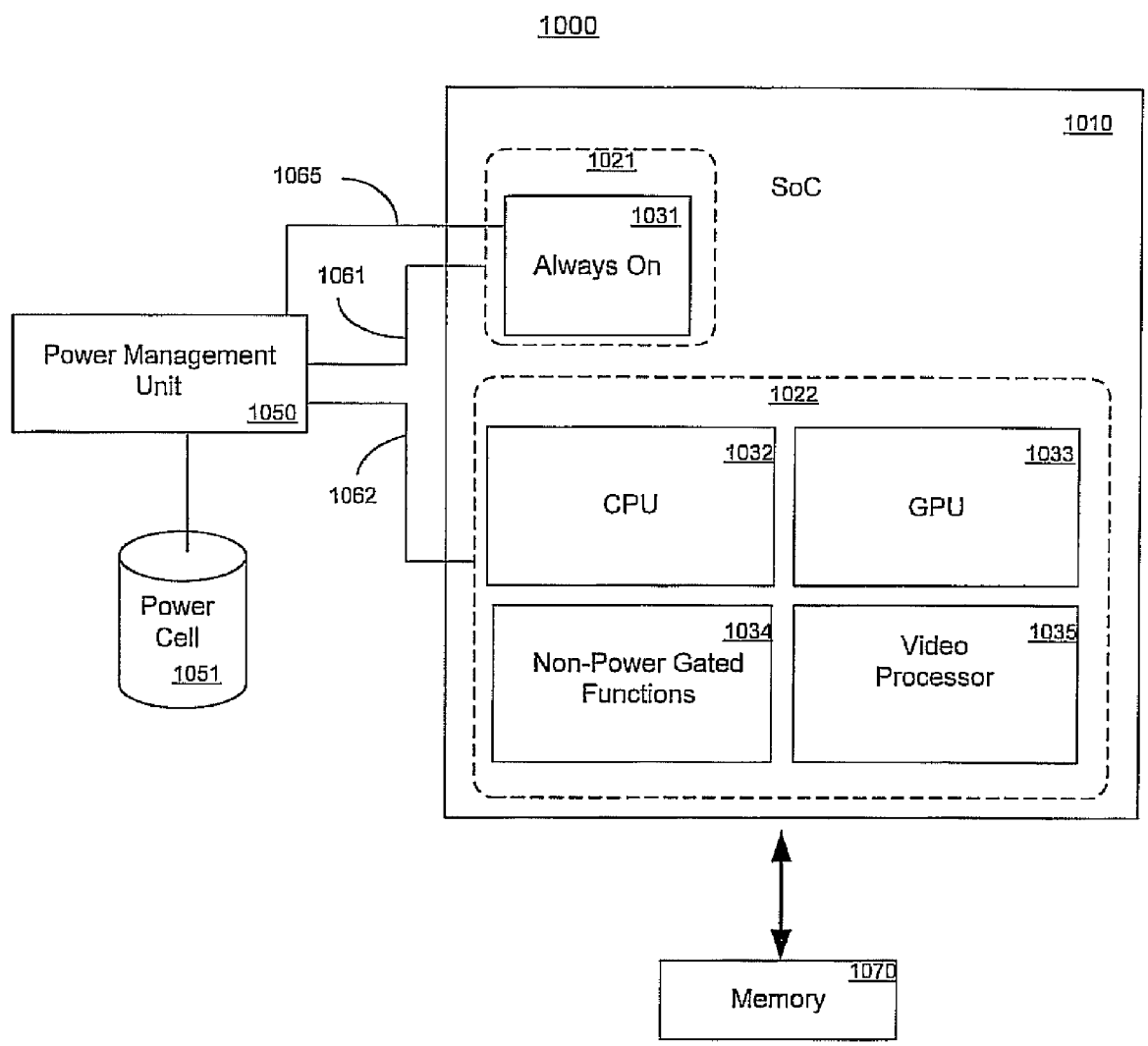
FIG. 10 shows another exemplary architecture that incorporates an exemplary video processor or graphics processor in accordance with one embodiment of the present invention.

FIG. 10 shows another exemplary architecture that incorporates an exemplary video processor or graphics processor in accordance with one embodiment of the present invention. As depicted in FIG. 10, system 1000 embodies a programmable SOC integrated circuit device 1010 which includes a two power domains 1021 and 1022. The power domain 1021 includes an "always on" power island 1031. The power domain 1022 is referred to as the core of the SOC and includes a CPU power island 1032, a GPU power island 1033, a non-power gated functions island 1034, and an instance of the video processor. The FIG. 10 embodiment of the system architecture 1000 is targeted towards the particular intended device functions of a battery-powered handheld SOC integrated circuit device. The SOC 1010 is coupled to a power management unit 1050, which is in turn coupled to a power cell 1051 (e.g., one or more batteries). The power management unit 1050 is coupled to provide power to the power domain 1021 and 1022 via the dedicated power rail 1061 and 1062, respectively. The power management unit 1050 functions as a power supply for the SOC 1010. The power management unit 1050 incorporates power conditioning circuits, voltage pumping circuits, current source circuits, and the like to transfer energy from the power cell 1051 into the required voltages for the rails 1061-1062.

In the FIG. 10 embodiment, the video processor is within the domain 1022. The video processor provides specialized video processing hardware for the encoding of images and video. As described above, the hardware components of the video processor are specifically optimized for performing real-time video encoding. The always on power island 1031 of the domain 1021 includes functionality for waking up the SOC 1010 from a sleep mode. The components of the always on domain 1021 will remain active, waiting for a wake-up signal. The CPU power island 032 is within the domain 1022. The CPU power island 1032 provides the computational hardware resources to execute the more complex software-based functionality for the SOC 1010. The GPU power island 1033 is also within the domain 1022. The GPU power island 1033 provides the graphics processor hardware functionality for executing 3-D rendering functions.

Figure 11:
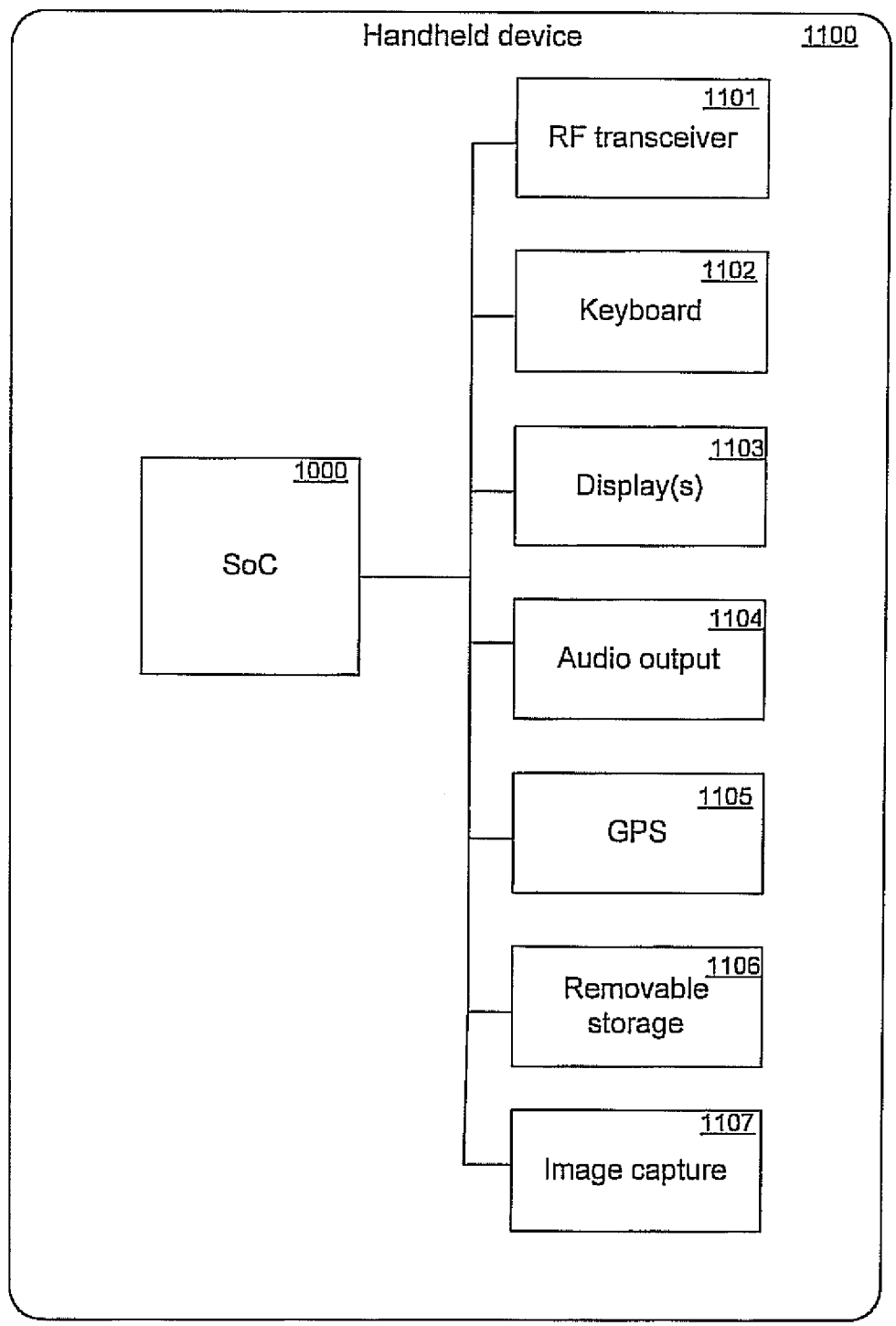
FIG. 11 shows a diagram showing the components of a handheld device 1100 in accordance with one embodiment of the present invention.

FIG. 11 shows a diagram showing the components of a handheld device 1100 in accordance with one embodiment of the present invention. As depicted in FIG. 11, a handheld device 1100 includes the system architecture 1000 described above in the discussion FIG. 10. The handheld device 1100 shows peripheral devices 1101-1107 that add capabilities and functionality to the device 1100. Although the device 1100 is shown with the peripheral devices 1101-1107, it should be noted that there may be implementations of the device 1100 that do not require all the peripheral devices 1101-1107. For example, in an embodiment where the display(s) 1103 are touch screen displays, the keyboard 1102 can be omitted. Similarly, for example, the RF transceiver can be omitted for those embodiments that do not require cell phone or WiFi capability. Furthermore, additional peripheral devices can be added to device 1100 beyond the peripheral devices 1101-1107 shown to incorporate additional functions. For example, a hard drive or solid state mass storage device can be added for data storage, or the like.

The RF transceiver 1101 enables two-way cell phone communication and RF wireless modem communication functions. The keyboard 1102 is for accepting user input via button pushes, pointer manipulations, scroll wheels, jog dials, touch pads, and the like. The one or more displays 1103 are for providing visual output to the user via images, graphical user interfaces, full-motion video, text, or the like. The audio output component 904 is for providing audio output to the user (e.g., audible instructions, cell phone conversation, MP3 song playback, etc.). The GPS component 1105 provides GPS positioning services via received GPS signals. The GPS positioning services enable the operation of navigation applications and location applications, for example. The removable storage peripheral component 1106 enables the attachment and detachment of removable storage devices such as flash memory, SD cards, smart cards, and the like. The image capture component 1107 enables the capture of still images or full motion video. The handheld device 1100 can be used to implement a smart phone having cellular communications technology, a personal digital assistant, a mobile video playback device, a mobile audio playback device, a navigation device, or a combined functionality device including characteristics and functionality of all of the above.

Thus, the present invention facilitates enhanced diction of pixel alteration in an efficient and effective manner. The detection of pixel alteration can be utilized for a variety of functions including motion vector determination, video encoding, etc. Multiple instantiations of a single basic unit engine is capable of computing both SATD and SAD values. Pipelining and processing one row at a time facilitate optimal computation of SATD/SAD values. Configuration and organization of the computational units facilitates computation of SATD/SAD values of different partitions in a 16×16 macro and can simultaneously provide the values to motion control logic to evaluate motion vector winner decisions. The parallel operation of the multiple units (e.g., dual SATD/SAD engine, etc.) can expedite the motion search process based on the co-ordinates (e.g. motion vectors, etc.) of the motion search algorithm.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:
1. A pixel alteration analysis system comprising:
a difference summing multiple engine component determines the sum of differences between pixel values in a plurality of pixels, wherein said difference summing multiple engine component includes a plurality of engines and determines a relationship value between said pixel values associated with different frames in parallel, including being operable to accumulate results and provide costs in different levels of granularity; and
a control component for determining an indication of motion based upon said relationship of said pixels in said plurality of pixels.

2. A pixel alteration analysis system of claim 1 further comprising a difference determination component for determining a difference in values for said pixels in a block at different frames.

3. A pixel alteration analysis system of claim 1 wherein said plurality of pixels are associated with an image movement.

4. A pixel alteration analysis system of claim 1 wherein said control component issues mode control.

5. A pixel alteration analysis system of claim 4 wherein said mode control includes a Sum of the Absolute Transform Difference (SATD) mode.

6. A pixel alteration analysis system of claim 4 wherein said mode control includes Sum of the Absolute Difference (SAD) mode.

7. A pixel alteration analysis system of claim 4 wherein said mode control indicates partition size.

8. A pixel alteration analysis system of claim 1 further comprising a data routing component for routing data to a difference determination component.

9. A pixel alteration analysis system of claim 8 wherein said data routing component selects among current pixel data, stored predicted pixel data, super sampled predicted data and internally computed predicted data.

10. A pixel alteration analysis method comprising:
receiving values of pixels in a plurality of blocks, wherein said values include values of said pixels in each one of said plurality of blocks at different frames;
accumulating results and providing costs in different levels of granularity; and
determining a relationship value between values of pixels in each one of said plurality of blocks at said different frames in parallel.

11. A pixel alteration analysis method of claim 10 further comprising determining a difference in said values of each one of said pixels in each one of said plurality of blocks at different frames.

12. A pixel alteration analysis method of claim 10 wherein said determining a relationship value includes a SATD value.

13. A pixel alteration analysis method of claim 10 wherein said determining a relationship value includes a SAD value.

14. A pixel alteration analysis method of claim 10 further comprising detecting an image motion indication based upon said relationship value.

15. A pixel alteration analysis method of claim 10 wherein a row of said values of pixels in said blocks is processed at a time.

16. A pixel alteration analysis method of claim 10 further comprising performing a mode determination.

17. A pixel alteration analysis method of claim 16 wherein said receiving includes selecting between among current pixel data, stored predicted pixel data, super sampled predicted data and internally computed predicted data based upon said mode determination.

18. An image motion detection method comprising:
performing a pixel alteration analysis process in which the analysis includes determination of sums of absolute difference relationships associated with values of corresponding pixels in different frames for multiple blocks of pixels in parallel, wherein said alteration analysis process includes accumulating results and providing costs in different levels of granularity; and
determining an indication of image motion based upon results of said pixel alteration analysis process.

19. An image motion detection method of claim 18 further utilizing results of the pixel alteration analysis process as a cost function for determining a motion vector for an image.

* * * * *